US006865297B2

(12) United States Patent
Loui et al.

(10) Patent No.: US 6,865,297 B2
(45) Date of Patent: Mar. 8, 2005

(54) METHOD FOR AUTOMATICALLY CLASSIFYING IMAGES INTO EVENTS IN A MULTIMEDIA AUTHORING APPLICATION

(75) Inventors: Alexander C. Loui, Penfield, NY (US); Eric Pavie, Paris (FR)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/706,145

(22) Filed: Nov. 12, 2003

(65) Prior Publication Data
US 2004/0208377 A1 Oct. 21, 2004

Related U.S. Application Data

(63) Continuation-in-part of application No. 10/413,673, filed on Apr. 15, 2003.

(51) Int. Cl.[7] .................................................. G06K 9/62
(52) U.S. Cl. ........................ 382/224; 382/170; 345/723; 358/453
(58) Field of Search ................................. 345/589, 719, 345/722, 723; 700/6, 63; 709/219; 375/240.1, 287; 358/3.01, 453, 466; 707/5, 8; 382/103, 106, 164, 165, 168, 170, 171, 172, 173, 175, 177, 178, 184, 224, 203, 225, 232, 237, 236, 227, 260, 270, 274, 291, 305; 348/701, 700, 169, 699; 706/52

(56) References Cited

U.S. PATENT DOCUMENTS

| 4,396,903 A | 8/1983 | Habicht et al. ............. 382/103 |
| 4,567,610 A | 1/1986 | McConnell ................. 382/170 |
| 5,083,860 A | 1/1992 | Miyatake et al. ........... 352/129 |
| 5,539,841 A | 7/1996 | Huttenlocher et al. ...... 382/218 |

(List continued on next page.)

OTHER PUBLICATIONS

"Introduction to Statistical Pattern Recognition" by Keinosuki Fukanaga. From Introduction to Statistical Pattern Recognition, Boston, Academic, U.S., pp. 508–518.

"Models for Time Coalescence in Event Logs" by Jeffery P. Hansen and Daniel P. Siewiorek. Fault–Tolerant Parallel and Distributed Systems, 1992. Digest of Papers, 1992 IEEE Workshop on Amherst, MA, USA, Jul. 6–7, 1992, Los Alamitos, CA, USA, IEEE Computer Soc. US, Jul. 6, 1992, pp. 221–227.

"Automatic Video Indexing and Full–Video Search for Object Appeareances" by Akio Nagasaka and Yuzur Tanaka. Visual Database Systems, II. Second Working Conference, Sep. 30–Oct. 3, 1991, Budapest, Hungary; Amsterdam, Netherlands, 1991, pp. 113–127.

(List continued on next page.)

*Primary Examiner*—Bhavesh M. Mehta
*Assistant Examiner*—Seyed Azarian
(74) *Attorney, Agent, or Firm*—David M. Woods

(57) ABSTRACT

A method for automatically classifying images into events for composing and authoring of a multimedia image program on a recordable optical disc comprises the steps of: (a) receiving a plurality of images having either or both date and/or time of image capture; (b) determining one or more largest time differences of the plurality of images based on clustering of the images; (c) separating the plurality of images into events based on having one or more boundaries between events which one or more boundaries correspond to the one or more largest time differences; (d) specifying at least one multimedia feature that is related to each event; (e) encoding the images between event boundaries and the at least one multimedia feature associated therewith into an event bitstream; and (f) writing each event bitstream to the recordable optical disc, whereby each event is authored into a separate section of the recordable optical disc.

26 Claims, 13 Drawing Sheets

U.S. PATENT DOCUMENTS

| | | | |
|---|---|---|---|
| 5,576,759 A | 11/1996 | Kawamura et al. | 348/207.99 |
| 5,594,807 A | 1/1997 | Liu | 382/128 |
| 5,598,557 A | 1/1997 | Doner et al. | 395/605 |
| 5,717,613 A | 2/1998 | Nakajima | |
| 5,717,643 A | 2/1998 | Iwanami et al. | 365/201 |
| 5,719,643 A | 2/1998 | Nakajima | 348/700 |
| 5,751,378 A | 5/1998 | Chen et al. | 348/700 |
| 5,809,161 A | 9/1998 | Auty et al. | 382/104 |
| 5,842,194 A | 11/1998 | Arbuckle | 706/52 |
| 5,872,859 A | 2/1999 | Gur et al. | 382/128 |
| 6,012,091 A | 1/2000 | Boyce | 709/219 |

OTHER PUBLICATIONS

"Semantic Agents for Content–Based Discovery in Distributed Image Libraries" by Eddie C. Shek, Asha Vellaikal, Son K. Dao, Brad Perry. Content–Based Access of Image and Video Libraries, 1998, Proceedings IEEE Workshop on Santa Barbara, CA, USA, Jun. 21, 1998, Los Alamitos, CA, USA, IEEE Computer Soc., USA, pp. 19–23.

"Image retrieval using efficient local–area matching" by V.V.Vinod, Hiroshi Murase. Machine Vision and Applications, vol. 11, no. 1, Jun. 1998, pp. 7–15.

| 70a | | | 70b | | | 70c | | |
|---|---|---|---|---|---|---|---|---|
| 0.32 | 0.45 | 0.11 | 0.34 | 0.56 | 0.76 | 0.87 | 0.24 | 0.09 |
| 0.22 | 0.10 | 0.07 | 0.41 | 0.48 | 0.80 | 0.77 | 0.44 | 0.26 |
| 0.03 | 0.16 | 0.37 | 0.46 | 0.68 | 0.69 | 0.75 | 0.21 | 0.02 |
| 0.21 | 0.34 | 0.24 | 0.56 | 0.87 | 0.51 | 0.48 | 0.11 | 0.14 |
| 0.26 | 0.22 | 0.19 | 0.27 | 0.38 | 0.23 | 0.31 | 0.12 | 0.25 |
| 0.01 | 0.08 | 0.18 | 0.15 | 0.18 | 0.21 | 0.12 | 0.20 | 0.21 |

METHOD FOR AUTOMATICALLY CLASSIFYING IMAGES INTO EVENTS IN A MULTIMEDIA AUTHORING APPLICATION

CROSS-REFERENCE TO RELATED PATENT MATERIALS

Reference is made to commonly assigned U.S. Pat. No. 6,606,411, entitled "Method for Automatically Classifying Images into Events" and issued 12 Aug. 2003 in the names of Alexander C. Loui and Eric S. Pavie, and is a continuation-in-part of commonly-assigned copending U.S. Ser. No. 10/413,673, entitled "A Method for Automatically Classifying Images into Events" and filed 15 Apr. 2003 in the names of Alexander C. Loui and Eric S. Pavie, both of which are incorporated herein by reference.

FIELD OF THE INVENTION

The invention relates generally to the field of image processing having image understanding that automatically classifies pictures by events and the like and, more particularly, to such automatic classification of pictures by block-based analysis which selectively compares blocks of the images with each other.

BACKGROUND OF THE INVENTION

Pictorial images are often classified by the particular event, subject or the like for convenience of retrieving, reviewing, and albuming of the images. Typically, this has been achieved by manually segmenting the images, or by the below-described automated method. The automated method includes grouping by color, shape or texture of the images for partitioning the images into groups of similar image characteristics.

Although the presently known and utilized methods for partitioning images are satisfactory, there are drawbacks. The manual classification is obviously time consuming, and the automated process, although theoretically classifying the images into events, is susceptible to miss-classification due to the inherent inaccuracies involved with classification by color, shape or texture.

Consequently, a need exists for overcoming the above-described drawbacks.

SUMMARY OF THE INVENTION

The present invention is directed to overcoming one or more of the problems set forth above. Briefly summarized, according to one aspect of the present invention, the invention resides in a method for automatically classifying images into events for composing and authoring of a multimedia image program on a recordable optical disc. The method comprises the steps of: (a) receiving a plurality of images having either or both date and/or time of image capture; (b) determining one or more largest time differences of the plurality of images based on clustering of the images; (c) separating the plurality of images into events based on having one or more boundaries between events which one or more boundaries correspond to the one or more largest time differences; (d) specifying at least one multimedia feature that is related to each event; (e) encoding the images between event boundaries and the at least one multimedia feature associated therewith into an event bitstream; and (f) writing each event bitstream to the recordable optical disc, whereby each event is authored into a separate section of the recordable optical disc.

According to another aspect of the invention, the invention resides in a method for automatically classifying images into events in connection with an authoring application, where the method comprises the steps of: (a) receiving a plurality of images arranged in chronological order; (b) dividing the images into a plurality of blocks; (c) grouping the images into events based on block-based histogram correlation which includes computing a color histogram of each block and computing a histogram intersection value which determines the similarity between blocks; (d) specifying at least one multimedia feature that is related to each event; (e) encoding the images comprising an event and the at least one multimedia feature associated therewith into an event bitstream; and (f) writing each event bitstream to the recordable optical disc, whereby each event is authored into a separate section of the recordable optical disc.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the advantage of an improved multimedia authoring application based upon pre-classification of images by utilizing either or both date and time information and block-based comparisons. The pre-classified images are delineated by event break indicators and authored into separate sections, e.g., tracks, on a recordable optical disc.

DETAILED DESCRIPTION OF THE INVENTION

In the following description, the present invention will be described in the preferred embodiment as a software program. Those skilled in the art will readily recognize that the equivalent of such software may also be constructed in hardware.

Still further, as used herein, computer readable storage medium may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

In addition, the term "event" is defined herein as a significant occurrence or happening as perceived by the subjective intent of the user of the image capture device.

Before describing the present invention, it facilitates understanding to note that the present invention is preferably utilized on any well-known computer system, such a personal computer. Consequently, the computer system will not be discussed in detail herein. It is also instructive to note that the images are either directly input into the computer system (for example by a digital camera) or digitized before input into the computer system (for example by scanning).

Figure 1:
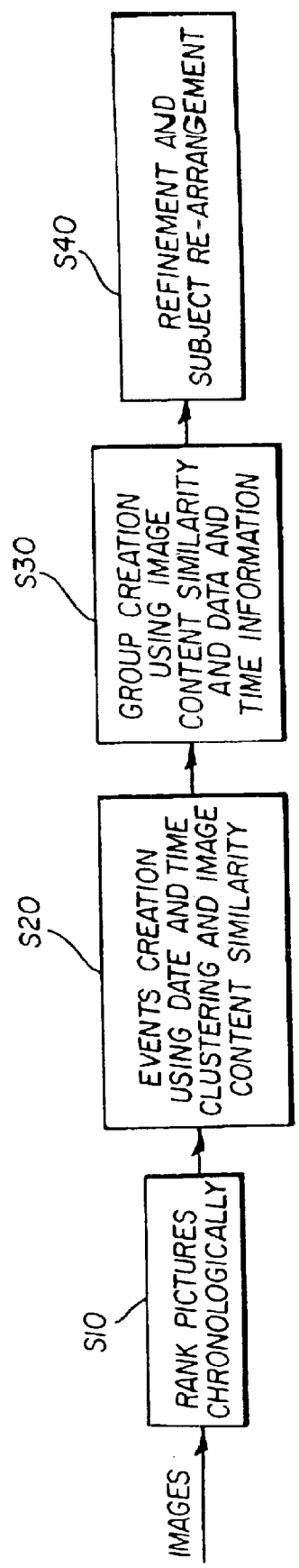
FIG. 1 is a block diagram illustrating an overview of a method for automatically classifying images into events.

Referring to now FIG. 1, there is illustrated a flow diagram illustrating an overview of a method for automatically classifying images into events, as shown in the related U.S. Pat. No. 6,606,411 and copending Ser. No. 10/413,673. Digitized images are input into the computer system where a software program will classify them into distinct categories. The images will first be ranked S10 in chronological order by analyzing the time and date of capture of each image. The date and/or time of capture of each picture may be extracted, for example, from the encoded information on the film strip of the Advanced Photo System (APS) images, or from information available from some digital cameras. The representations of the images will then be placed S20 into one of a plurality of distinct events by a date and time clustering analysis that is described below. Within each event, the contents of the images are analyzed S20 for determining whether images closest in time to an adjacent event should be maintained in the event as defined by the clustering analysis, or the adjacent events merged together. After the images are defined into events, a further sub-classification (grouping) within each event is performed. In this regard, the images within each event will then be analyzed by content S30 for grouping images of similar content together, and then the date and time S30 for further refining the grouping.

The event segmentation S20 using the date and time information is by a k-means clustering technique, as will be described in detail below, which groups the images into events or segments. A boundary check is then performed on the segments S20 for verifying that the boundary images should actually be grouped into the segment identified by the clustering, as will also be described below.

These groups of images are then sent to a block-based histogram correlator S30 for analyzing the content. For each event or segment sent to the correlator, a content or subject grouping S30 is performed thereon for further sub-classifying the images by subject within the particular event segment. For example, within one event, several different subjects may appear, and these subject groupings define these particular subjects. The subject grouping is based primarily on image content, which is performed by a block-based histogram correlation technique. This correlation compares portions of two images with each other, as will also be described in detail below. The result of the ranking is the classification of images of each segment into distinct subject groupings. The date and time of all the images within each subject grouping are then compared to check whether any two or more subject grouping can be merged into a single subject grouping S30.

A refinement and subject re-arrangement analysis S40 will further improve the overall classification and the subject grouping by rearranging certain images within a subject group.

Figure 2:
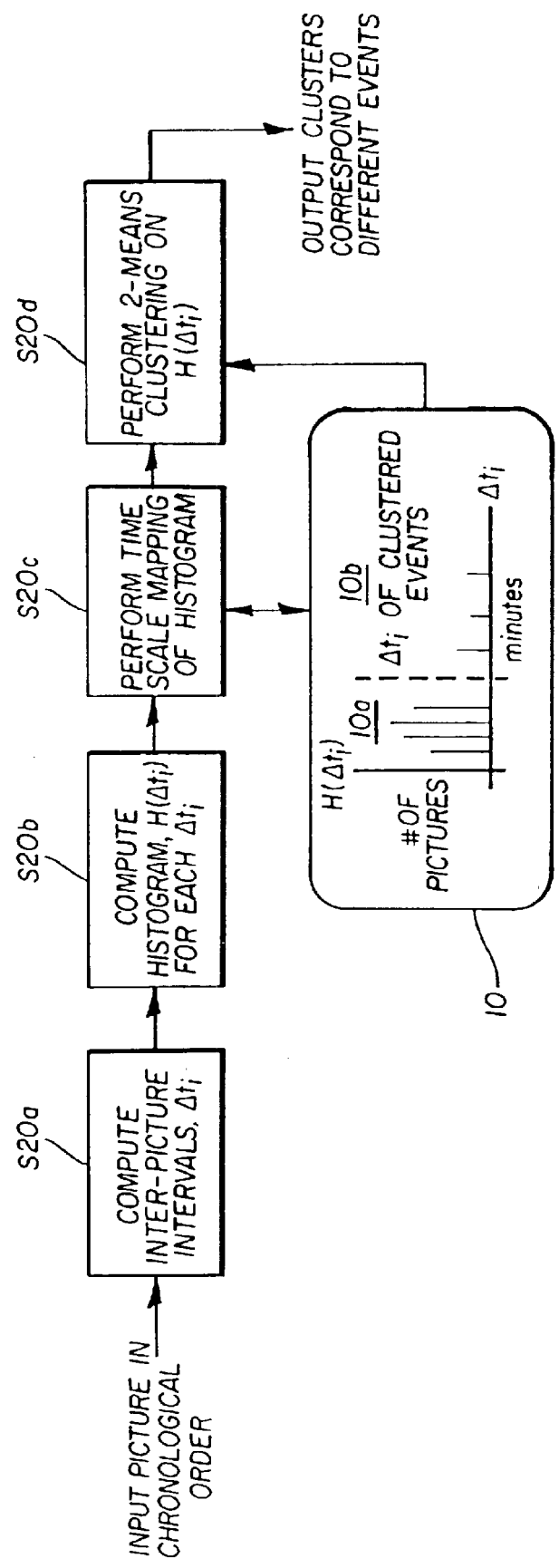
FIG. 2 is a block diagram illustrating a date and time clustering technique for use with the method of FIG. 1.
Figure 3:
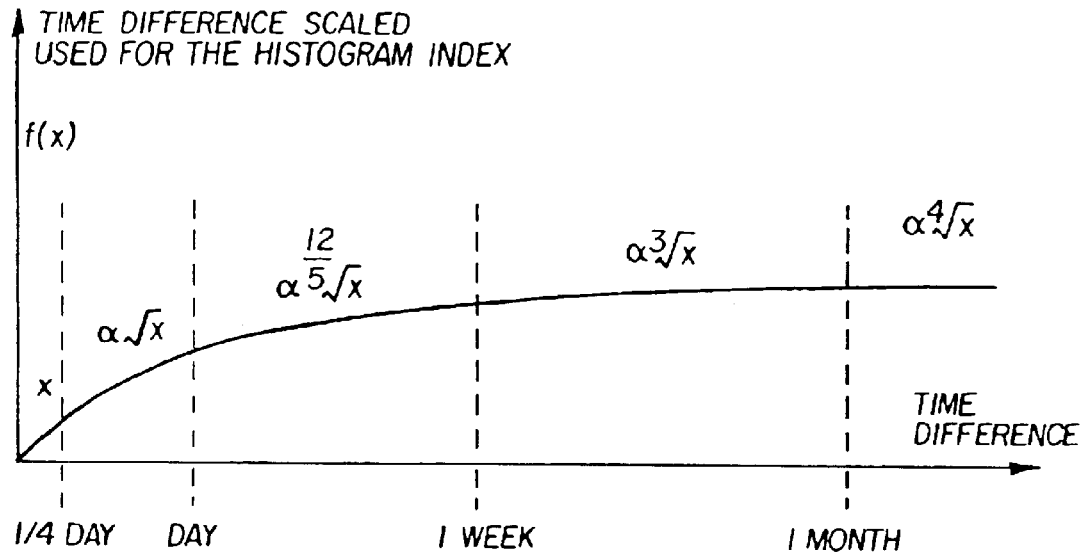
FIG. 3 is a graph illustrating a scaling function used to map the result of the 2-means clustering.

Referring to FIG. 2, there is shown an exploded block diagram illustrating the date and time clustering technique S20. First, the time interval between adjacent pictures (time difference) is computed S20a. A histogram of the time differences is then computed S20b, an example of which is shown in block 10. The abscissa of the histogram is preferably the time in minutes, and the ordinate of the histogram is the number of pictures having the specified time difference. The histogram is then mapped S20c to a scaled histogram using a time difference scaling function, which is shown in FIG. 3. This mapping is to take the pictures with small time difference and substantially maintain its time difference, and to take pictures with a large time difference and compress their time difference.

Figure 4:
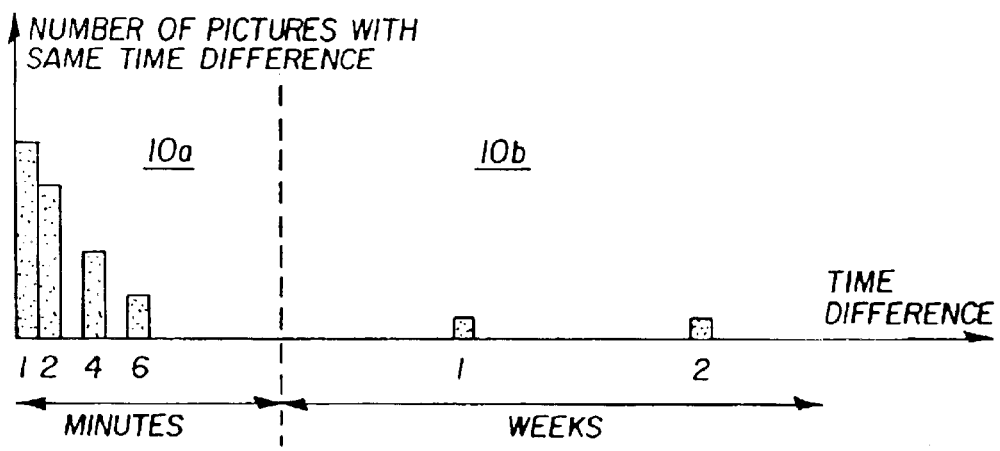
FIG. 4 is a graph illustrating a typical result of the scaling function of FIG. 3.

A 2-means clustering is then performed S20d on the mapped time-difference histogram for separating the mapped histogram 10 into two clusters based on the time difference; the dashed line represents the separation point for the two clusters. For further details of 2-means clustering, Introduction to Statistical Pattern Recognition, $2^{nd}$ edition by Keinosuke Fukunaga 1990 may be consulted, and therefore, the process of 2-means clustering will not be discussed in detail herein. Referring briefly to FIG. 4, the result of 2-means clustering is the segmentation of the histogram into two portions 10a and 10b. Normally, events are separated by large time differences. The 2-means clustering, therefore, is to define where these large time differences actually exist. In this regard, the right portion 10b of the 2-means clustering output defines the large time differences that correspond to the event boundaries.

Figure 5:
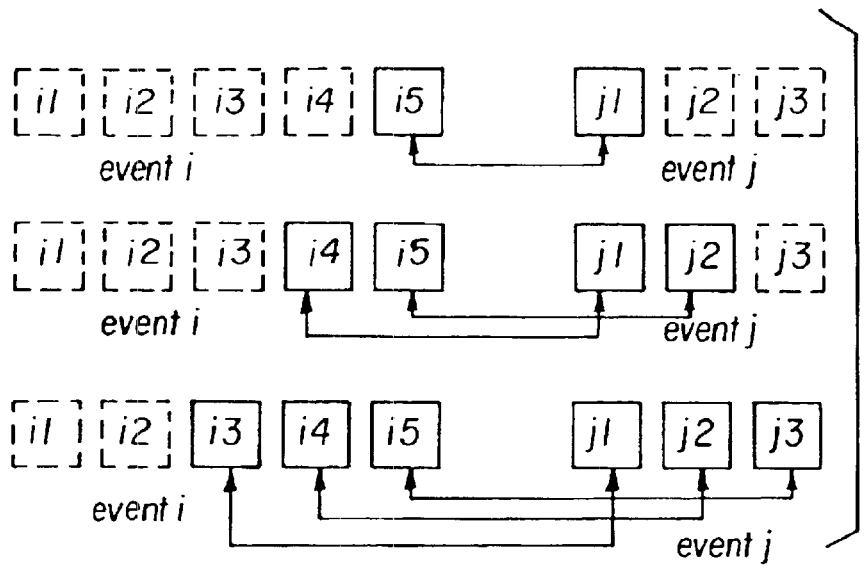
FIG. 5 is a diagram illustrating a block diagram of an event boundary checking after the date and time clustering.

Referring to FIG. 5, there is illustrated an example of boundary checking between events. For two consecutive events i and j, a plurality of block-based, histogram comparisons are made to check if the pictures at the border of one event are different from the pictures at the border of the other event. If the comparison of content is similar, the two segments are merged into one segment. Otherwise, the segments are not merged. Preferably, the comparisons are performed on the three border images of each event (i3, i4, i5 with j1, j2, j3), as illustrated in the drawing. For example, image i5 is compared with image j1 and etc. This block-based histogram comparison technique will be described in detail hereinbelow.

Figure 6:
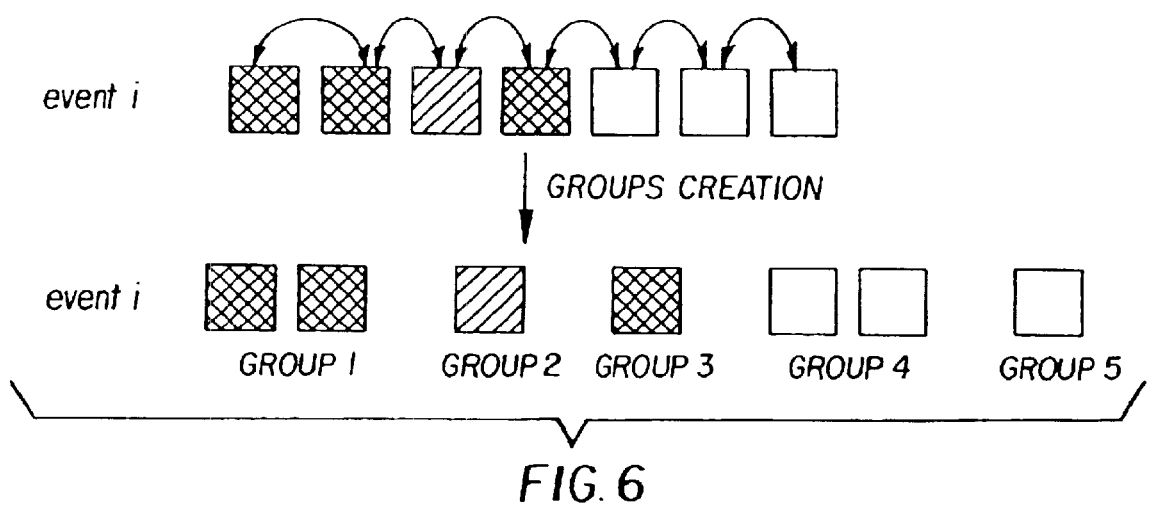
FIG. 6 is a diagram illustrating grouping of images within each event based on content.

Referring to FIG. 6, there is illustrated an overview of subject (content) grouping for each segmented event. Within each segmented event i, adjacent pictures are compared (as illustrated by the arrows) with each other using the below-described, block-based histogram technique. For example, the block-based histogram technique may produce five subject groupings (for example groups 1–5) from the one event i, as illustrated in the drawing. The arrangement of the subject grouping is stored for future retrieval during the subject arrangement step s40. In particular, the subject grouping having a single image is stored (for example groups 2, 3, and 5).

Figure 7:
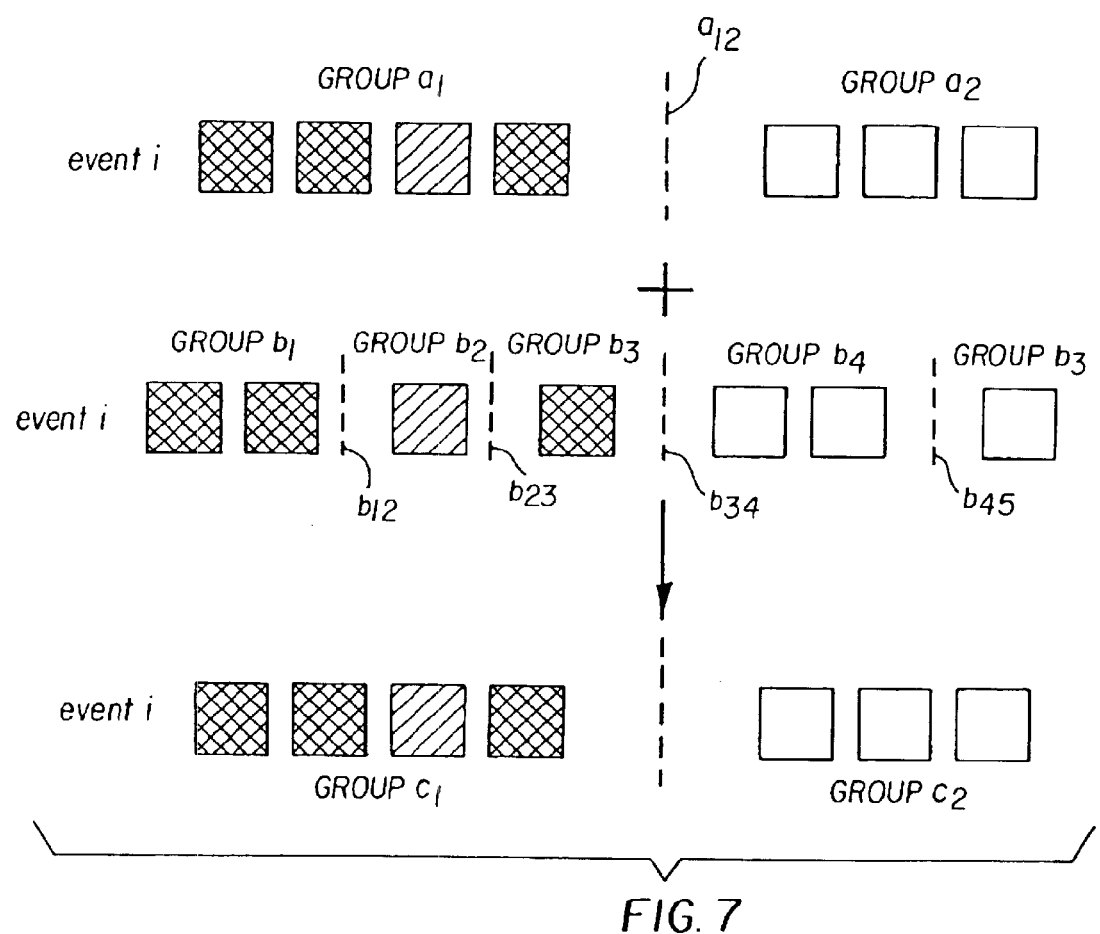
FIG. 7 is a block diagram of a group-merging step.

Referring to FIG. 7, after the grouping by content, a time and date ordering is performed on the groupings for merging groups together based on a time and date analysis. A histogram of the time difference between adjacent images in the event is computed, similar to FIG. 4. A predetermined number of the largest time differences (for example boundary $a_{12}$) are compared with the boundaries (for example boundaries $b_{12}$, $b_{23}$, $b_{34}$, $b_{45}$) of the subject grouping determined by the block-based analysis. The predetermined number of largest time differences are determined by dividing the total number of images within an event by the average number of picture per group (four is used in the present embodiment). If the boundary of the subject grouping matches the boundary based on the chosen time differences, the subject groupings will not be merged. If there is not a match between the two boundaries, the subject groupings having a boundary not having a matched time difference in the histogram will be merged into a single subject grouping (for example groups $b_1$, $b_b$, $b_3$ merged into resulting group $c_1$).

Figure 8:
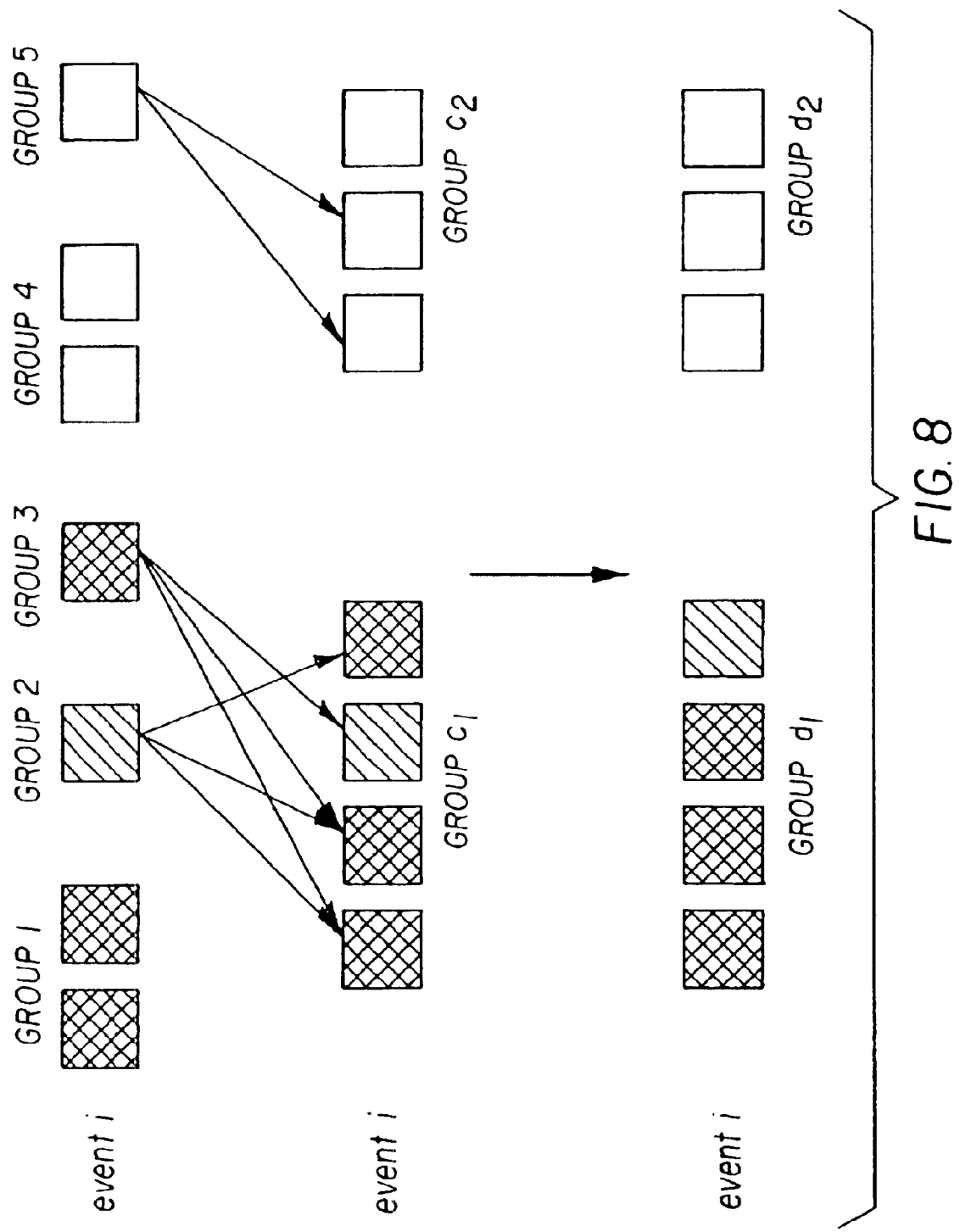
FIG. 8 is a block diagram of image re-arrangement within each group.

Referring to FIG. 8, there is illustrated a diagram of image re-arrangement within each group. The arrangement of the initial subject groupings is retrieved for identifying subject groupings that contain single images (for example the groups with a single image of FIG. 6—groups 2, 3, and 5 that are re-illustrated as groups 2, 3, and 5 in FIG. 8). Any single images from the same subject grouping that are merged as identified by the merged subject grouping (for example, groups $c_1$ and $c_2$ of FIG. 7) are compared with all other images in the merged subject grouping, as illustrated by the arrows. This comparison is based on block-based histogram analysis. If the comparisons are similar, these images will be re-arranged so that the similar images are located adjacent each other, for example groups $d_1$ and $d_2$.

Further refinement is done by comparing any group that still contains a single image after the above procedure, with all the images in the event. This is to check if these single image groups can be better arranged within the event grouping. This comparison is similar to the subject re-arrangement step of FIG. 8.

Figure 9A:
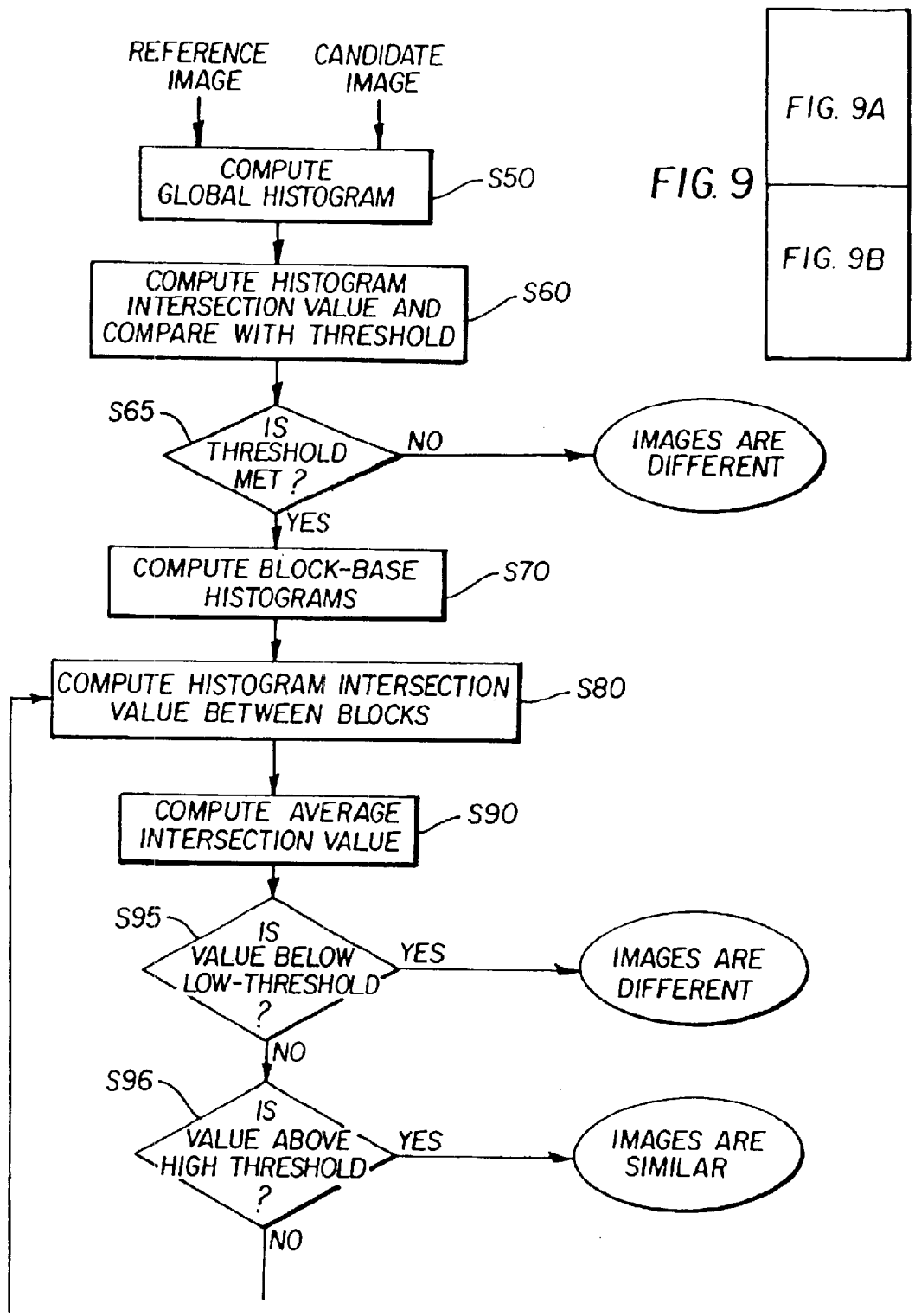
FIGS. 9A and 9B show a flowchart of a block-based histogram correlation technique.
Figure 9B:
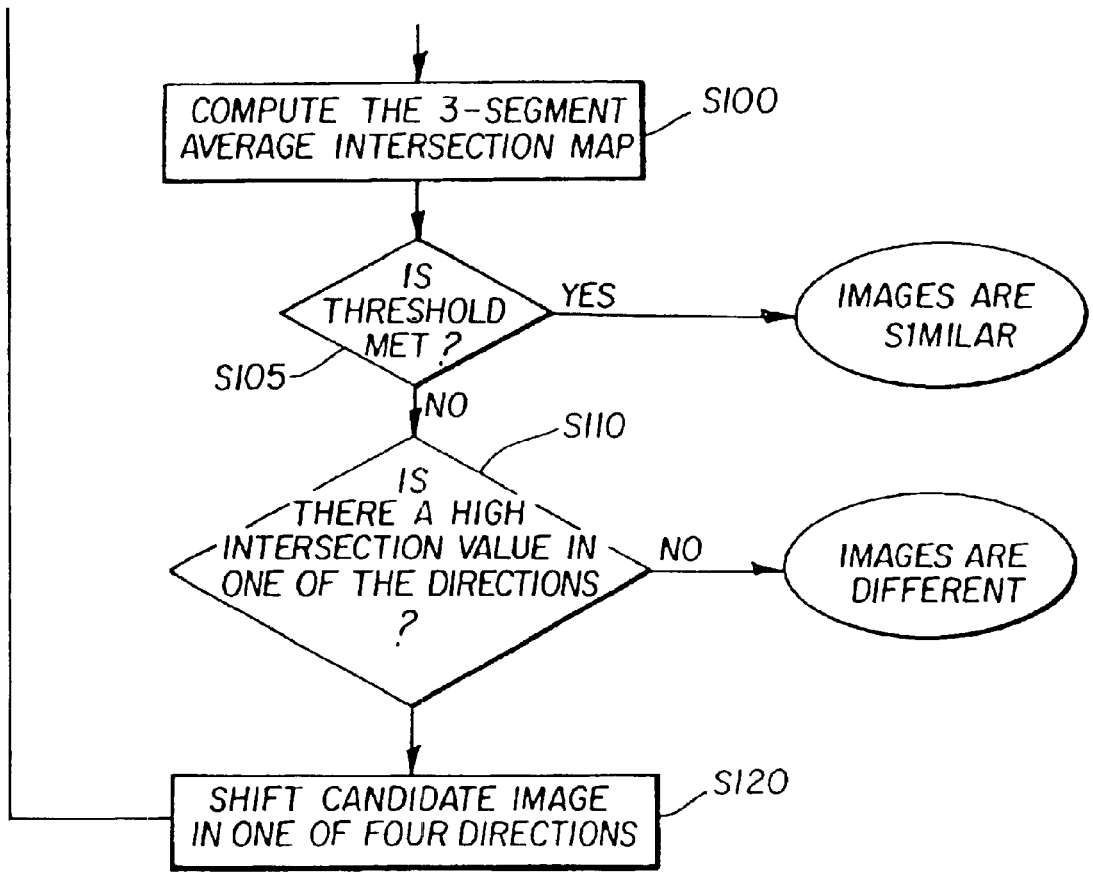
Figures 10, 11:
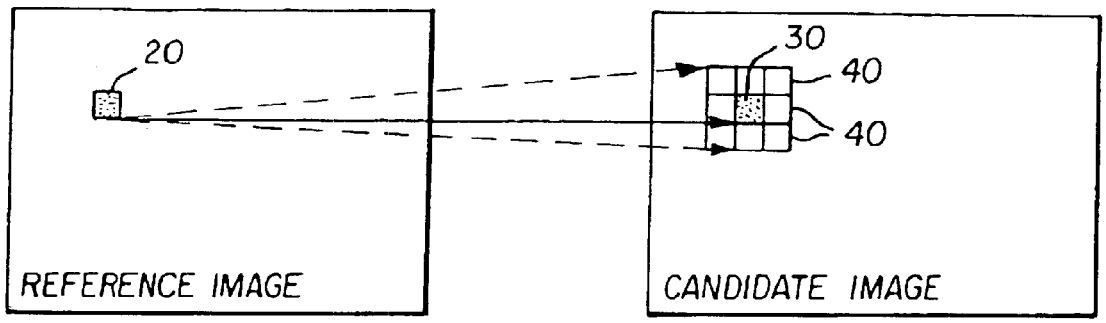
FIG. 10 is diagram illustrating the comparison between block histograms.
FIG. 11 is diagram of an example of best intersection mapping for three segment analysis.

Referring to FIGS. 9A and 9B, there is illustrated a flowchart of the block-based histogram correlation used in the above analyses. First, a histogram of the entire image of both images is computed S50, a global histogram. A comparison of the two histograms is performed by histogram intersection value S60 illustrated the following equation:

$$Inter(R, C) = \frac{\sum_{i=1}^{n} \min(R_i, C_i)}{\sum_{i=1}^{n} R_i}$$

where R is the histogram of the reference image, C is the histogram of the candidate image, and n is the number of bins in the histogram. If the intersection is under a threshold S65, preferably 0.34, although other thresholds may be used, the images are different. If the threshold is met or exceeded S65, then a block-based histogram correlation will be performed S70. In this regard, each image will be divided into blocks of a given size, preferably 32×32 pixels in the present embodiment. It is instructive to note that those skilled in the art may vary the block size depending on the resolution of the image. For each block, a color histogram is computed. Referring to FIG. 10, if one image is considered a reference image and one image a candidate image, the images are compared in the following way. Each block 20 of the reference image is compared to the corresponding block 30 of the candidate image and to the adjacent blocks 40, e.g., 8 blocks in the present embodiment.

Referring to FIG. 9A, the block histograms between the reference image and the candidate image are compared using the histogram intersection equation defined above S80. The average intersection value is derived by computing the average of the best intersection values from each of the block comparisons S90. This average intersection value will be compared to a low threshold (preferably 0.355), and a high threshold (preferably 0.557). If the average intersection value is below the low threshold S95, the two images are considered different. If the average intersection value is above the high threshold S96, then the two images are considered similar. If the average intersection value is between these two thresholds, further analysis will be performed as described below (3-segment average intersection map S100).

Referring to both FIGS. 9B and 11, a 3-segment analysis will be performed to determine if the two images may contain a similar subject. This is performed by first forming a map 60 which contains the average of the two highest intersection values of each of the block comparisons; for example, 9 comparisons were performed in the illustration of FIG. 10, the average of the highest two will be used for map 60. FIG. 11 illustrates, for example, a 9×6 block although it should be understood that the map size depends on the size of the image. This map is divided into three parts: the left portion 70a, the center portion 70b, and the right portion 70c. If the average intersection value of the center portion 70b is higher than a threshold (preferably 0.38) S105, the two images may contain a very similar subject in the center portion 70b of the image, and the two images may be considered to be similar by subject. In addition, the comparisons of the histogram will be performed with the reference and candidate images reversed. If the two images are similar both methods should give substantially similar correlation; obviously if they are different, the results will not be similar. The images are then checked S110 to determine if there is a high intersection value in one of the directions, right, left, up, and down.

Figure 12:
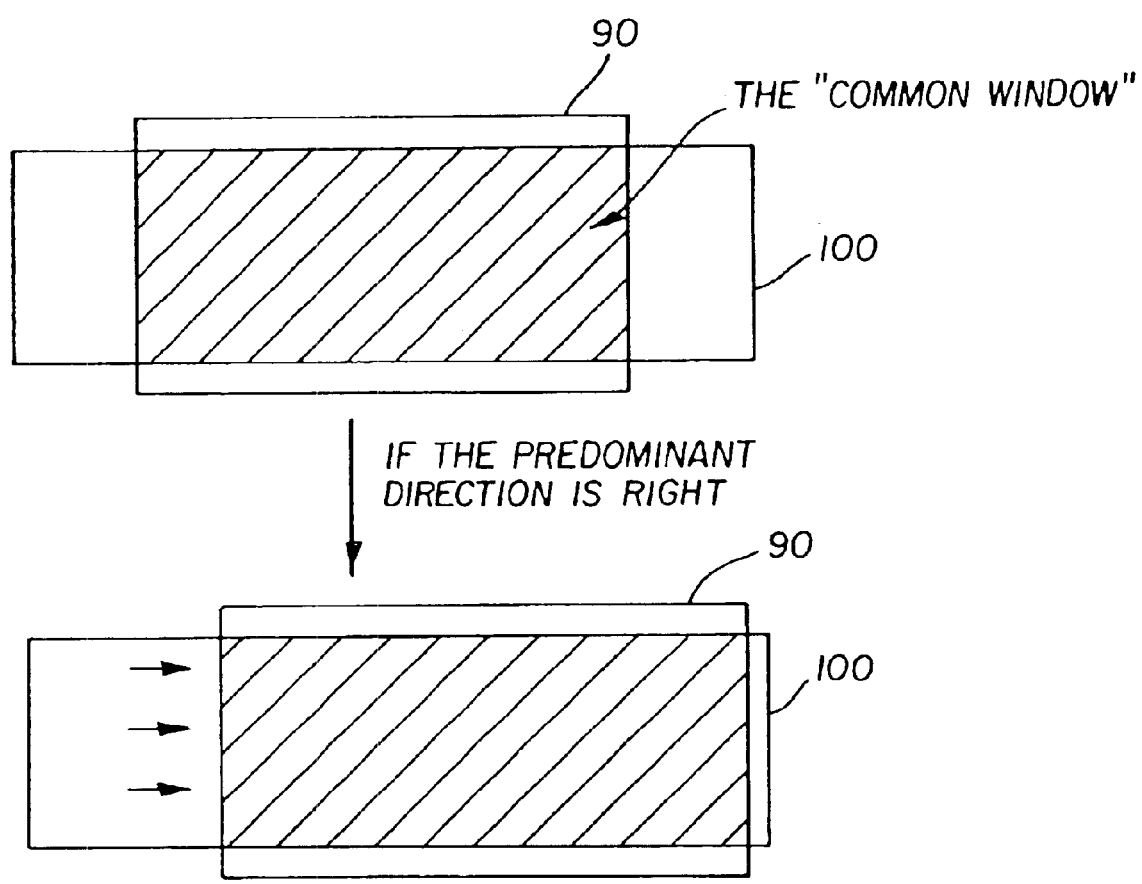
FIG. 12 is an illustration of shift detection within the block based histogram correlation.

Referring to FIGS. 9B and 12, shift detection is used to determine the case when the two images 90 and 100 (of two different sizes in the drawing) have very similar subject that appears in different locations of the image. For example, the main subject may be situated in the center of one image and to the left-hand side of the other image. Such a shift can be determined by recording both the best intersection values of the reference blocks, as well as the coordinates of the corresponding candidate blocks. This is achieved by comparing the intersection values of the blocks in four directions (right, left, up, and down). The entire image will be shifted by one block (as illustrated by the arrows) in one of the directions (right in the drawing) where the best intersection value is the highest. The above analysis and the shift can be repeated S120 to check for similarity.

The method for automatically classifying images into events according to the foregoing description may be used with an event-clustering algorithm for imaging applications that will benefit from a pre-organization of images with date/time metadata information. More specifically, one usage relates to a multimedia image authoring application, such as disclosed in commonly-assigned, co-pending U.S. patent application Ser. No. 09/885,577, entitled "System and Method for Authoring a Multimedia Enabled Disc" and filed 20 Jun. 2001 in the names of A. Loui, D. Cok and Y. Lo, which is incorporated herein by reference. The multimedia software application disclosed therein allows a user to import personal images and music files for composing and authoring of a multimedia disc. Such a disc can be in the form of a VCD (Video CD) or a DVD that can be played back in a consumer DVD player.

One of the most time-consuming tasks in using an authoring application is the composition stage. This stage includes the time-consuming task of selecting, ordering, and grouping of images to create the final slideshow. In situations where a large number of images are used, the process could take a considerable amount of time to accomplish these tasks. What is needed is an automated organization tool that would be useful in most commercial multimedia authoring applications. One effective way of facilitating or reducing the time spent in these tasks is to employ an automated event clustering function of the type described herein to segment a large collection of images into separate events and sub-events. In the case of the multimedia image authoring application described in Ser. No. 09/885,577, each event or sub-event can then be marked to indicate the beginning of a separate track (VCD) or chapter (DVD) in the final multimedia disc. The user will also have the opportunity to make some correction or minor adjustment to the resulting image clusters obtained from the algorithm. The addition of this functionality will greatly enhance the usefulness and efficiency of the multimedia authoring process, thereby allowing the user to instead focus more on the creative tasks.

Figure 13A:
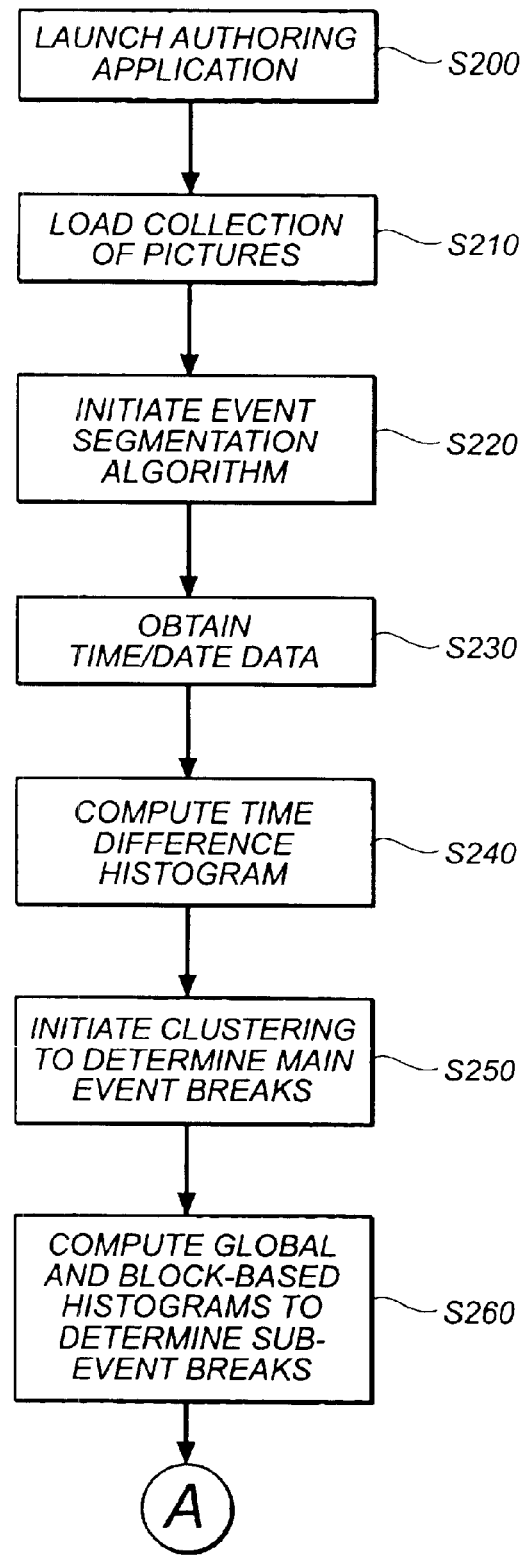
FIGS. 13A and 13B show a block diagram illustrating an overview of a method for automatically classifying images into events in an authoring application according to the present invention.
Figure 13B:
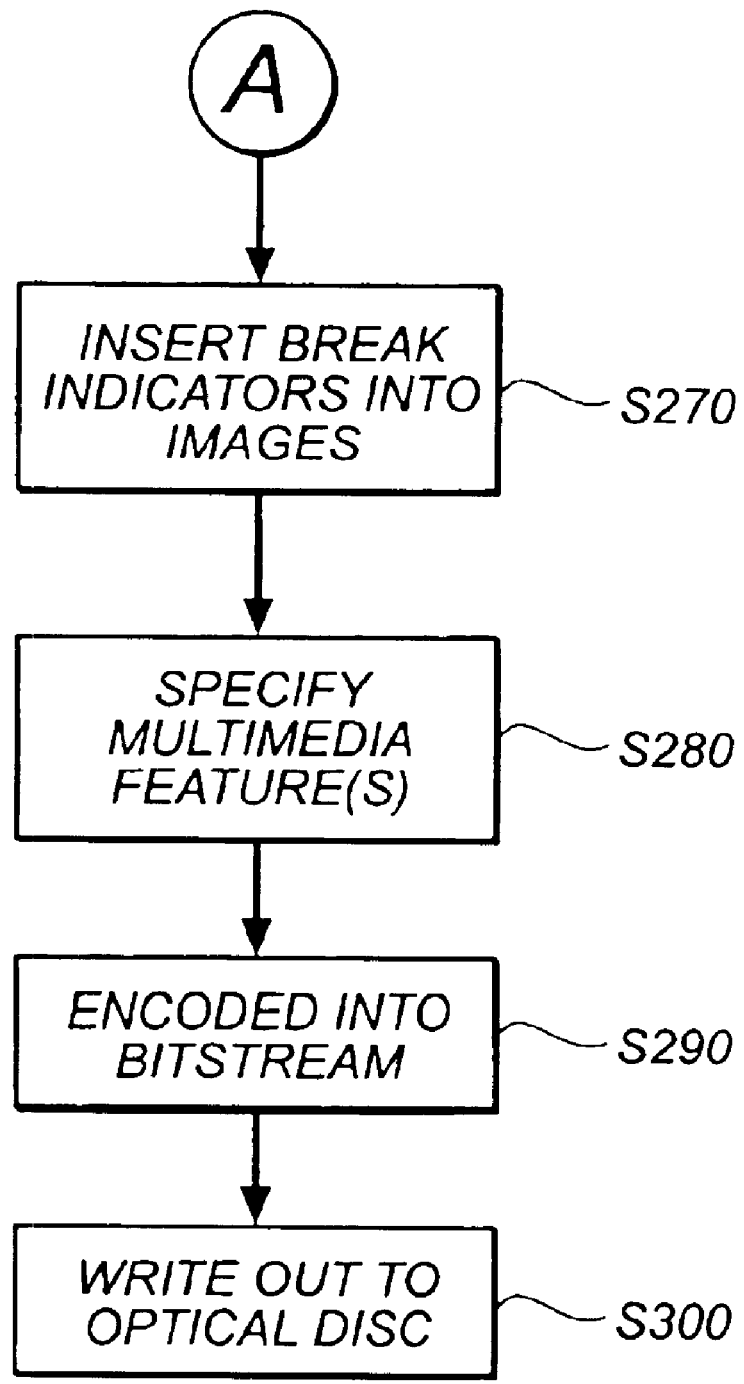

Turning now to FIGS. 13A and 13B, a method is shown for automatically classifying images into events in an authoring application according to the present invention. The event clustering algorithm used by this authoring application is based on the event-clustering algorithm shown in FIG. 1, which uses date and time information. However, the event clustering may be based on block-based histogram correlation, as shown in FIGS. 9A and 9B. More specifically, the present invention teaches how to efficiently utilize an automated organization tool to facilitate multimedia authoring of images, thus providing a practical solution to the authoring of a large collection of image content for TV viewing. The main steps of a preferred embodiment of the above authoring process with event clustering are illustrated in FIGS. 13A and 13B and summarized as follows.

A user launches (S200) the authoring software application, e.g., for a Kodak Picture VCD, in, e.g., a Windows-based PC. Then, a collection of pictures are loaded into the workspace area of the authoring application (S210). More particularly, the workspace area comprises a graphical user interface screen that is presented to the user in order to enable the event clustering algorithm and the authoring application. Next, the user presses an event clustering button on the screen to initiate (S220) the event segmentation algorithm. The algorithm reads the time stamp metadata (S230) from each of the images in the workspace. Then, a time-difference histogram is computed (S240) for each of the images in the workspace, and a 2-means clustering function is initiated (S250) to determine the main event breaks. Global and block-based histogram correlations are computed (S260) to determine sub-event breaks within each main event. The event segmentation algorithm described to this point is the same as described in connection with FIGS. 1 through 12, and reference should be made to that earlier description for further details of the implementation. Main event and sub-event break indicators are then inserted (S270) into the collection of images in the workspace.

At this point, at least one specific multimedia feature is specified (S280) that is related to each event, and the images between event boundaries and the multimedia feature(s) associated therewith are encoded (S290) into an event bitstream and written out (S300) to a recordable optical disc, such as a VCD or a DVD. Among the available multimedia features that may be specified, the user may select music for each event (or sub-event) segment for encoding, and may select other composition features, such as voice and text annotations, rotate, zoom, transition and other special effect(s) for each image. In the encoding step S290, the user presses an encoding button to initiate MPEG encoding of each separate event. A number of MPEG bitstreams, with each corresponding to one of the separate events, will appear in the Movies/Albums section of the graphical user interface screen. If an appropriate menu option is selected, the user may want to rename each bitstream to reflect the nature of the event. Finally, in the write step S300, the user presses the write button on the screen to initiate the VCD or DVD creation process, and the user may subsequently view and enjoy VCD or DVD playback on a TV via a conventional DVD player.

Figure 14:
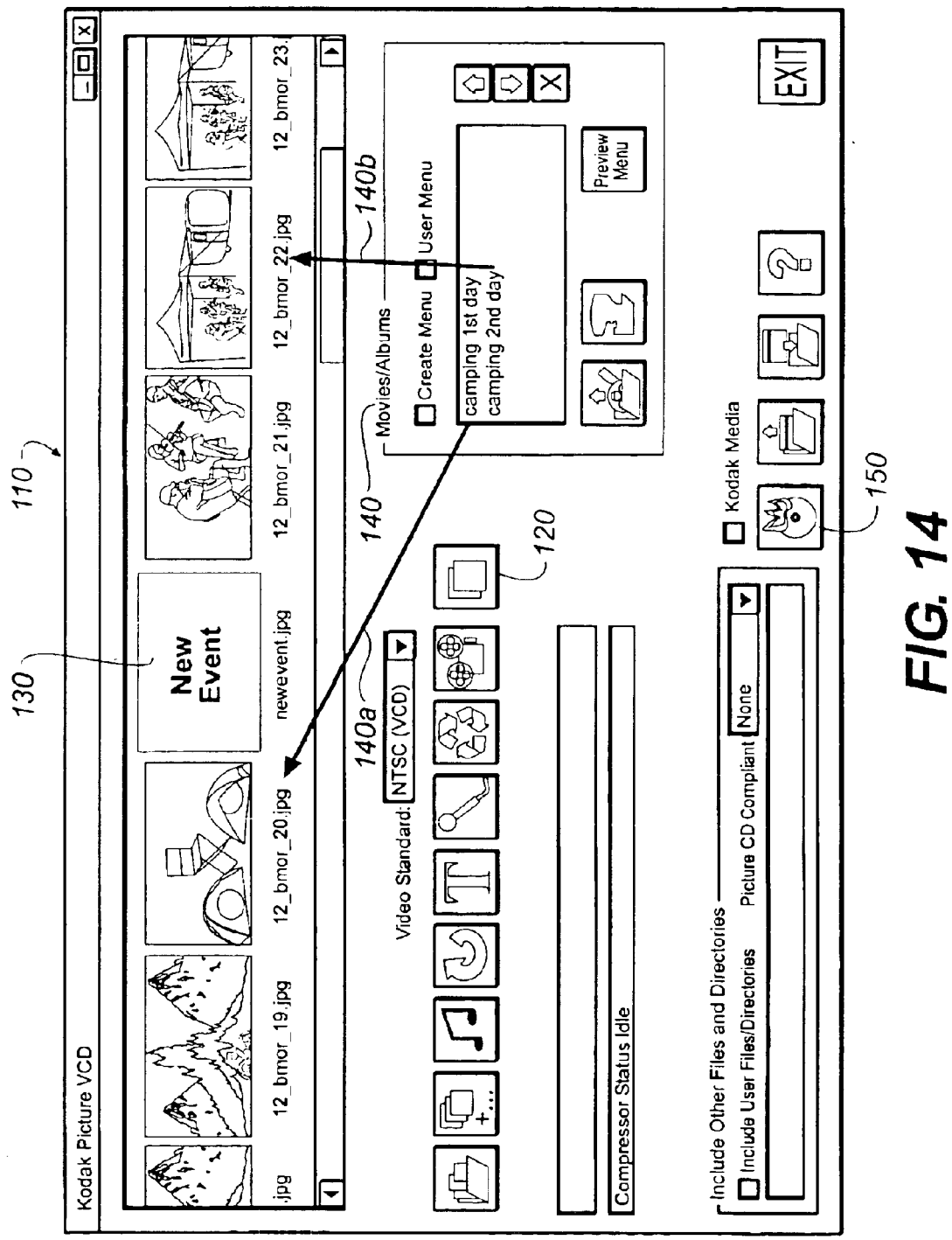
FIG. 14 is an illustration of a graphical user interface screen for implementing the method shown in FIGS. 13A and 13B.

FIG. 14 illustrates the results of the event clustering algorithm when applied to the images in the workspace area 110 of the Kodak multimedia image authoring software (a.k.a. Picture VCD). As seen from FIG. 14, the event clustering algorithm is initiated by clicking an event clustering button 120. Thereupon, the event clustering algorithm automatically inserts a new event break 130 between images 12_bmor_20.jpg and 12_bmor_21.jpg based on the date/time and/or image content information. There are other event and sub-event breaks that are not shown in FIG. 14 due to the size of the visible workspace area 110. These two events can then be authored separately into two different sections of the recordable optical disc, e.g., into two different tracks in the case of VCD creation. Indeed, they are labeled as "camping $1^{st}$ day" and "camping $2^{nd}$ day" in the Movies/Albums section 140 of the authoring application, where the arrows 140a, 140b show the relationship of the respective label to the respective event (such arrows are for explanatory purposes and would not ordinarily show in the actual workspace area 110). At this point, an optical disc, e.g., a VCD, can be created by clicking the button for writing a VCD. The authoring application will create a VCD with two separate tracks with user input titles "camping $1^{st}$ day" and "camping $2^{nd}$ day" respectively, if the menu feature is selected. If no menu feature is selected, the VCD will just contain two tracks and they will be played consecutively in a DVD player. The eventual benefit of this is that the end user can easily sort out and group meaningful pictures belonging to the same event together, for viewing and presentation on a TV via a multimedia disc.

The invention has been described with reference to a preferred embodiment. However, it will be appreciated that variations and modifications can be effected by a person of ordinary skill in the art without departing from the scope of the invention.

Parts List 10 mapped histogram
10a portion
10b portion
20 block
30 corresponding block
40 adjacent blocks
60 map
70a left portion
70b center portion
70c right portion
90 first image
100 second image
110 workspace area
120 event clustering button
130 event break
140 movies/album section
140a relationship arrow
140b relationship arrow
150 write button S10 ranking step
S20 event creation step
S20a internal computation step
S20b histogram computation step
S20c time scale mapping step
S20d clustering step
S30 group creation step
S40 rearrangement step
S50 global histogram computation step
S60 intersection computation step
S65 threshold step
S70 block-based correlation step
S80 intersection computation step
S90 average intersection computation step
S95 low threshold step
S96 high threshold step
S100 3 segment mapping step
S105 threshold step
S110 image checking step
S120 image shifting step
S200 launch authoring application step
S210 load pictures step
S220 initiate event segmentation step
S230 obtain time/date step
S240 compute time difference histogram step
S250 initiate clustering step
S260 compute global and block-based histogram step
S270 insert break indicators step
S280 specify multimedia feature(s) step
S290 encode into bitstream step
S300 write optical disc step

What is claimed is:

1. A method for automatically classifying images into events for composing and authoring of a multimedia image program on a recordable optical disc, the method comprising the steps of:

(a) receiving a plurality of images having either or both date and/or time of image capture;

(b) determining one or more largest time differences of the plurality of images based on clustering of the images;

(c) separating the plurality of images into events based on having one or more boundaries between events which one or more boundaries correspond to the one or more largest time differences;

(d) specifying at least one multimedia feature that is related to each event;

(e) encoding the images between event boundaries and the at least one multimedia feature associated therewith into an event bitstream; and (f) writing each event bitstream to the recordable optical disc, whereby each event is authored into a separate section of the recordable optical disc.

2. The method as in claim 1, wherein step (b) includes computing a time difference histogram and performing a 2-means clustering on the time difference histogram for defining the one or more boundaries.

3. The method as in claim 2, wherein step (b) further includes mapping the time difference histogram through a time difference scaling function before performing the 2-means clustering.

4. The method as in claim 2, wherein step (c) includes checking the images adjacent the one or more boundaries for similarity by comparing content of the images.

5. The method as in claim 4, wherein step (c) includes checking the images adjacent the one or more boundaries for similarity by using a block-based histogram correlation technique.

6. The method as in claim 5 wherein following step (c) the events are divided into subject grouping by using an image content analysis.

7. The method as in claim 6, wherein following step (c) the events are divided into subject grouping by using a block-based histogram correlation technique.

8. The method as in claim 7, further including comparing two of the images by shifting one of the images in a desired direction based on an intersection value and then computing the block based correlation.

9. The method as in claim 8, further including forming a map that contains two best intersection values of each of the block comparisons; dividing the map into three portions; and then comparing center portions for similarity.

10. The method as claimed in claim 1 wherein the recordable optical disc is a VCD or a DVD.

11. The method as claimed in claim 1 wherein the multimedia feature includes an music audio clip.

12. The method as claimed in claim 1 wherein the multimedia feature includes an voice audio clip.

13. The method as claimed in claim 1 wherein the multimedia feature includes text annotations.

14. The method as claimed in claim 1 wherein the multimedia feature includes rotation of one or more of the images.

15. The method as claimed in claim 1 wherein the multimedia feature includes zooming of one or more of the images.

16. The method as claimed in claim 1 wherein the multimedia feature includes a transition or a special effect applied to one or more of the images.

17. A method for automatically classifying images into events for composing and authoring of a multimedia image program on a recordable optical disc, the method comprising the steps of:

(a) receiving a plurality of images arranged in chronological order;

(b) dividing the images into a plurality of blocks;

(c) grouping the images into events based on block-based histogram correlation which includes computing a color histogram of each block and computing a histogram intersection value which determines the similarity between blocks;

(d) specifying at least one multimedia feature that is related to each event;

(e) encoding the images comprising an event and the at least one multimedia feature associated therewith into an event bitstream; and (f) writing each event bitstream to the recordable optical disc, whereby each event is authored into a separate section of the recordable optical disc.

18. The method as in claim 17, wherein step (c) includes comparisons of two of the images by shifting one of the images in a desired direction based on the intersection value and then computing the block based correlation.

19. The method as in claim 18, wherein step (c) includes forming a map that contains two best intersection values of each of the block comparisons; dividing the map into three portions; and then comparing center portions for similarity.

20. The method as claimed in claim 17 wherein the recordable optical disc is a VCD or a DVD.

21. The method as claimed in claim 17 wherein the multimedia feature includes an music audio clip.

22. The method as claimed in claim 17 wherein the multimedia feature includes an voice audio clip.

23. The method as claimed in claim 17 wherein the multimedia feature includes text annotations.

24. The method as claimed in claim 17 wherein the multimedia feature includes rotation of one or more of the images.

25. The method as claimed in claim 17 wherein the multimedia feature includes zooming of one or more of the images.

26. The method as claimed in claim 17 wherein the multimedia feature includes a transition or a special effect applied to one or more of the images.

* * * * *